(12) United States Patent
Bushnell et al.

(10) Patent No.: US 8,094,799 B2
(45) Date of Patent: Jan. 10, 2012

(54) ENABLING AND DISABLING TERMINATING FEATURES OF A TERMINATING SWITCH

(75) Inventors: William J. Bushnell, St. Charles, IL (US); Steven M. Miller, Batavia, IL (US)

(73) Assignee: Alcatel Lucent, Paris (FR)

( * ) Notice: Subject to any disclaimer, the term of this patent is extended or adjusted under 35 U.S.C. 154(b) by 896 days.

(21) Appl. No.: 12/154,888

(22) Filed: May 28, 2008

(65) Prior Publication Data

US 2009/0296910 A1    Dec. 3, 2009

(51) Int. Cl.
*H04M 3/42* (2006.01)
(52) U.S. Cl. ............... 379/202.01; 379/229; 379/204.01
(58) Field of Classification Search ............. 379/202.01, 379/204.01, 229
See application file for complete search history.

(56) References Cited

U.S. PATENT DOCUMENTS

| | | | |
|---|---|---|---|
| 6,330,323 B1 * | 12/2001 | Gottlieb et al. | 379/220.01 |
| 6,987,841 B1 * | 1/2006 | Byers et al. | 379/88.17 |
| 7,408,925 B1 * | 8/2008 | Boyle et al. | 370/352 |
| 2003/0096591 A1 * | 5/2003 | Pohutsky et al. | 455/406 |
| 2004/0058670 A1 * | 3/2004 | Pohutsky et al. | 455/406 |
| 2006/0285670 A1 * | 12/2006 | Chin et al. | 379/201.01 |
| 2007/0117508 A1 * | 5/2007 | Jachner | 455/3.06 |

* cited by examiner

*Primary Examiner* — Creighton Smith
(74) *Attorney, Agent, or Firm* — Carmen Patti Law Group, LLC (57) ABSTRACT

An apparatus in one example has: a telecommunication system having an originating switch operatively coupled to at least one terminating switch; the terminating switch having at least one terminating call feature for a respective terminating terminal operatively coupled thereto; and the telecommunication system having a terminating call feature control function such that enabling and disabling of the at least one terminating call feature for the respective terminating terminal is effected by a predetermined signal message from the originating switch. Thus, embodiments of the present method and apparatus provide a mechanism for communication from the originating switch to the terminating switch regarding the nature of the call and the kinds of terminating features that are to be applied or not applied.

20 Claims, 5 Drawing Sheets

ENABLING AND DISABLING TERMINATING FEATURES OF A TERMINATING SWITCH

TECHNICAL FIELD

The invention relates generally to telecommunication systems, and in particular to enabling and disabling terminating call features of a terminating switch in a telecommunication system.

BACKGROUND

Today enterprise based and carrier based telephony systems work on the principle of an originating switch with a set of call origination features and a terminating switch with a specific set of terminating features. Unfortunately there is no mechanism for the originating switch to signal the terminating switch to apply or disable specific terminating feature for a particular call. A similar situation applies with telephony switching system for intra switch calls. In this case, the switch has call origination software processes and call termination software processes but there is no mechanism to signal between these process regarding which terminating features should be applied on a particular call. There are several existing and proposed telephony services, which would benefit by the ability for the originating switch or software process to be able to signal to the terminating switch or software process as to which terminating features should be applied. These include automatic initiation of a multiparty conference call and simultaneously ringing multiple phones (e.g. home phone and mobile phone) when a single number is dialed.

Today enterprise based and carrier based telephony systems enable users to manually set up on demand conference calls to three or more parties. To establish the conference call, the initiator individually dials each intended participant. The initiator must confirm that the intended party answers the phone. The initiator then signals the network to add that party to the conference bridge. The initiator can then either join the conference bridge of continue adding additional participants.

The existing process of manually establishing a conference call between three or more participants has many drawbacks. Some of these drawbacks are as follows:

(1) The initiator must manually signal the network the number for each participant. The initiator must confirm that each participant answers the phone.

(2) If a participant's phone is busy or is not answered, the initiator must be able to manually terminate that call attempt. Otherwise all conference call participants will hear the busy tone or ring tone.

(3) If the called participant is not available (busy or no answer) and has a voice mail service, the call might be transferred to a voice mail system. Consequently if the initiator receives a voice mail system greeting, the initiator must be able to manual terminate that call attempt.

(4) If the call to a participant is not completed due to network congestion or incorrectly dialed digits, the call will receive network announcements. Again the initiator must be able to recognize these problems and terminate the call attempt.

(5) Manually placing calls to each participant and confirming answer is a time consuming process. It can take several minutes to manually contact and add all of the parties to the conference call. During this process of adding participants to the conference bridge, the participants already on the conference bridge are not able to monitor the initiator's activities. Consequently if there is an extended period in which the initiator is attempting to contact another participant, the participants on the conference bridge may hang up or abandon the conference call.

In contrast is would be very desirable if a user could automatically initiate a call to a number of people. For example, a group of people may be specified and a request may be made of a switch to individually call each of them at the same time and as they answer add them to a conference bridge.

A problem occurs, for example, when a person is called and they do not answer. The call may then automatically go to a voice mail system. Now those who are already connected to the bridge will hear the voice mail system announcement, which is undesirable. Consequently it would be beneficial if the originating switch could signal the terminating switch that for this call certain terminating features should be disabled. For example if the call is not answered or the line is busy do not forward the call to voice mail. If the call reaches a busy line, play the busy signal for a few seconds and then disconnect the call.

Another situation in which it would be beneficial for the originating switch to signal the terminating switch regarding which terminating features should be applied is the Simultaneous Ring feature. With simultaneous ringing, the called party can designate one or more phones that should ring when a particular phone is called. For example, when a home phone is called, a related mobile phone also rings. Whichever one is answered first gets the call and the other one stops ringing. But a problem occurs when the mobile phone is turned off, or when the mobile phone has lost registration with the mobile phone network. In this situation, the switch that servers the mobile phone will immediately send the call to voice mail, and the home phone does not ring. Consequently it would be beneficial for the switch that initiated the Simultaneous Ringing of the mobile phone to be able to send a message to the terminating switch for the mobile phone that this call should not invoke Call Forward not Registered.

SUMMARY

One embodiment according to the present method and apparatus is an apparatus that may comprise: a telecommunication system having an originating switch operatively coupled to at least one terminating switch; the terminating switch having at least one terminating call feature for a respective terminating terminal operatively coupled thereto; and the telecommunication system having a terminating call feature control function such that enabling and disabling of the at least one terminating call feature for the respective terminating terminal is effected by a predetermined signal message from the originating switch.

Another embodiment according to the present method and apparatus is an apparatus that may comprise: a telecommunication system having an originating switch operatively coupled to at least one terminating switch; a predetermined plurality of terminating terminals operatively coupled to the at least one terminating switch; the telecommunication system having a conference function; the terminating switch having at least one terminating call feature for a respective terminating terminal operatively coupled thereto; and the telecommunication system having a terminating call feature control function such that enabling and disabling of the at least one terminating call feature for the respective terminating terminal is effected by a predetermined signal message from the originating switch; wherein, upon activation of the conference function via the originating switch, the at least one terminating switch disabling respective terminating call features of each of the plurality of user terminals.

Another embodiment according to the present method and apparatus is a method that may comprise the steps of: designating a predetermined plurality of user terminals that are operatively coupled to at least one terminating switch; signaling the telecommunication system to establish a conference call with the predetermined plurality of user terminals; and the at least one terminating switch disabling respective terminating call features of each of the plurality of user terminals.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

In general, a telecommunication system may be a circuit switched communication system, a VoIP communication system, a video communication system, or any other type of communication system. A terminal, as used herein, may refer to a landline phone, a cellular phone, a VoIP phone, a personal data assistant, a personal computer, etc.

In telephone networks, the caller is connected to the person he wants to talk to by switches at various telephone exchanges. The switches form an electrical connection between the two users and the setting of these switches is determined electronically when the caller dials the number.

The fixed-line telephones in most residential homes are analogue. Although short-distance calls may be handled from end-to-end as analogue signals, increasingly telephone service providers are transparently converting the signals to digital for transmission before converting them back to analogue for reception. The advantage of this is that digitized voice data can travel side-by-side with data from the Internet and can be perfectly reproduced in long distance communication (as opposed to analogue signals that are inevitably impacted by noise).

Voice over Internet Protocol (VoIP) is a protocol optimized for the transmission of voice through the Internet or other packet switched networks that utilize servers. Almost the entire structure of the Internet is based upon a client-server model. A server is an application or device that performs services for connected clients as part of a client-server architecture.

VoIP systems carry telephony signals as digital audio, typically reduced in data rate using speech data compression techniques, encapsulated in a data packet stream over Internet Protocol. The Session Initiation Protocol (SIP) is a signalling protocol, widely used for setting up and tearing down multimedia communication sessions such as voice and video calls over the Internet. Other feasible application examples include video conferencing, streaming multimedia distribution, instant messaging, presence information and online games.

The Internet is a worldwide network of computers and computer networks that can communicate with each other using the Internet Protocol. The Internet works in part because of protocols that govern how the computers and routers communicate with each other. The nature of computer network communication lends itself to a layered approach where individual protocols in the protocol stack run more-or-less independently of other protocols. This allows lower-level protocols to be customized for the network situation while not changing the way higher-level protocols operate.

At the network layer, things become standardized with the Internet Protocol (IP) being adopted for logical addressing. For the world wide web, these "IP addresses" are derived from the human readable form using the Domain Name System.

At the transport layer, most communication adopts either the Transmission Control Protocol (TCP) or the User Datagram Protocol (UDP). TCP is used when it is essential every message sent is received by the other computer where as UDP is used when it is merely desirable. With TCP, packets are retransmitted if they are lost and placed in order before they are presented to higher layers. With UDP, packets are not ordered or retransmitted if lost.

Above the transport layer, there are certain protocols that are sometimes used and loosely fit in the session and presentation layers, most notably the Secure Sockets Layer (SSL) and Transport Layer Security (TLS) protocols. These protocols ensure that the data transferred between two parties remains completely confidential.

As used herein the term "switch" may refer to a switch or a server in a telecommunication system. In general, a call is originated at an originating switch, and is received at a terminating switch. According to the present method and apparatus the originating switch may signal a telecommunication system as to enable and disable terminating call features of the terminating switch.

One feature of the embodiments according to the present method and apparatus provides an initiator the ability to designate groups of friends or co-workers that the initiator wants to frequently invite to conference calls. The initiator may signal the network that a conference call to the group is to be established. Embodiments according to the present method and apparatus include expanded network signaling that allows the telephony system or switch supporting the initiator to signal to the telephony system or switch supporting each participant that the incoming call is associated with an automatically initiated conference.

Figure 1:
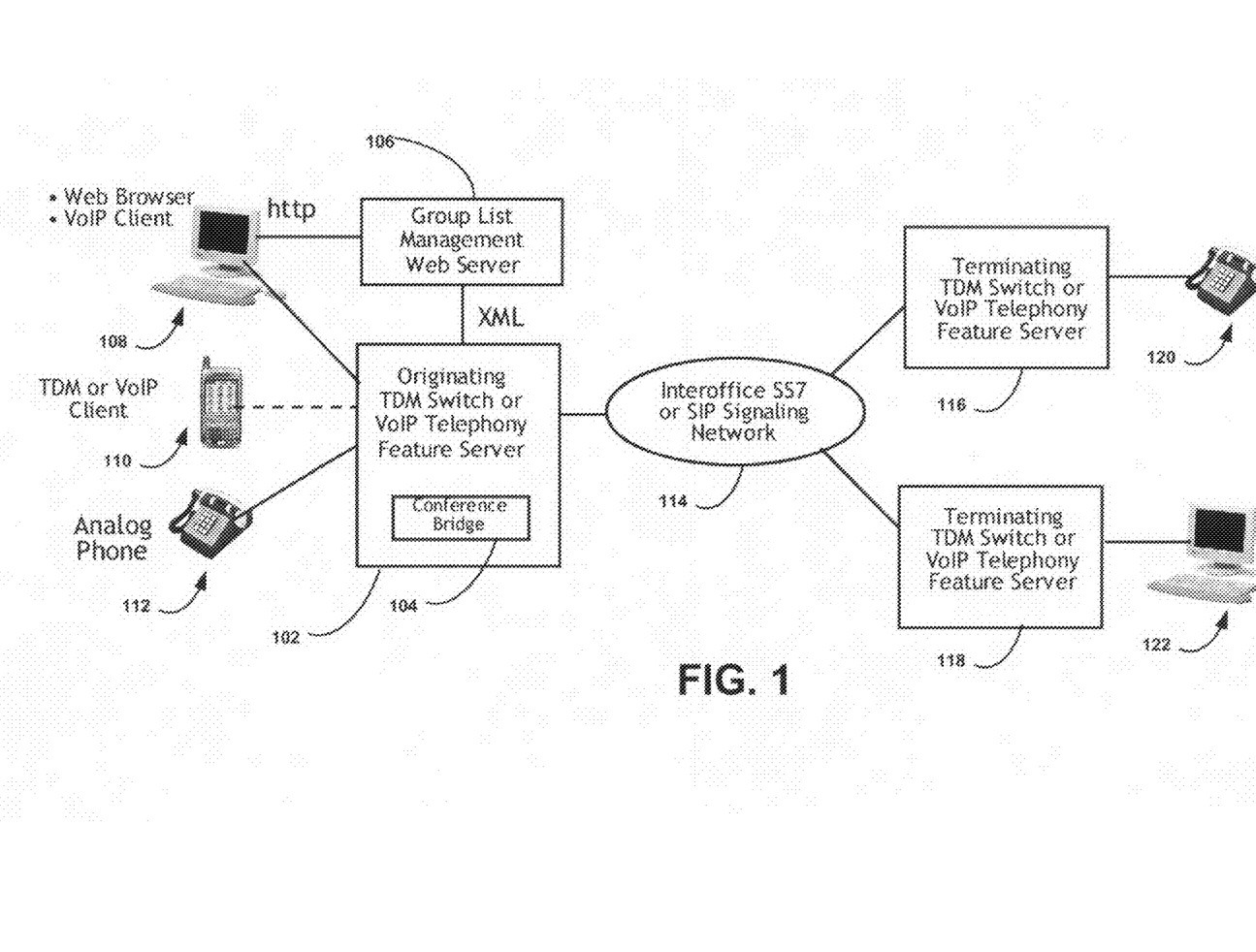
FIG. 1 depicts an embodiment according to the present method and apparatus that supports automatic group conference call.

FIG. 1 depicts an embodiment according to the present method and apparatus that supports automatic group conference call. As depicted in FIG. 1 originating terminals, such as PC 108, mobile terminal 110 and analog phone 112, are operatively coupled to an originating TDM switch or VoIP telephony feature server 102. The feature server 102 may have a conference bridge 104. In this embodiment the PC 108 and the feature server 102 communicates with group list management web server 106. The feature server 102 also communicates with terminating TDM switch or VoIP telephony feature servers 116, 118 via an interoffice SS7 or SIP signaling network 114. In this example, a standard telephone 120 may be operatively coupled to the feature server 116, and a PC 122 may be operatively coupled to the feature server 118. More specifically, according to an embodiment of the present method and apparatus, an SS7 signaling message or a VoIP message, such as a SIP message, is sent from an originating switch to respective terminating switches for a conference call. Each respective terminating switch applies whatever terminating features are assigned to that line. There may be a voice mail service if the call is not answered. It may be call forwarding. It may be simultaneous ring, to a boss and a secretary for example. It may be simultaneous ring to a home phone and a mobile phone. It may be other features.

Figure 2:
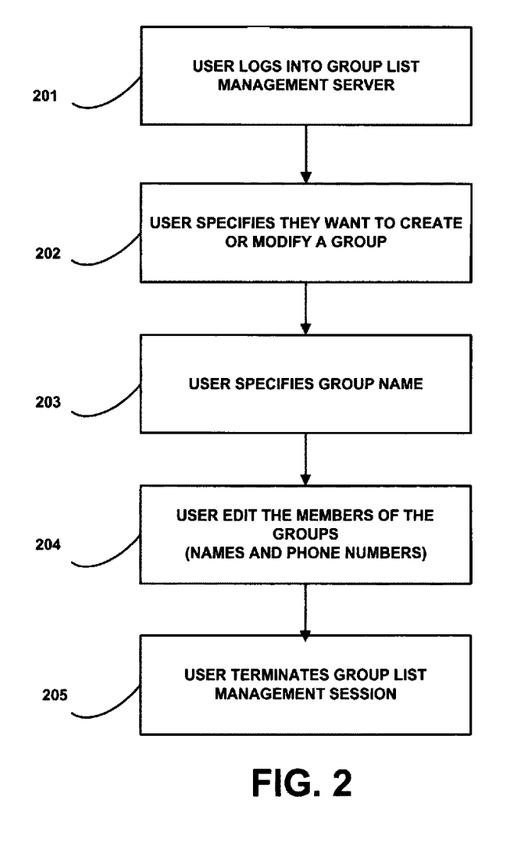
FIG. 2 is a flow diagram that depicts managing group lists for automatic initiation of group conference calls.

FIG. 2 is a flow diagram that depicts managing group lists for automatic initiation of group conference calls. This embodiment according to the present method and apparatus may have the following steps: user logs into group list management server (step 201); user specifies they want to create or modify a group (step 202); user specifies group name (step 203); user may edit the members of the group (names and phone numbers) (step 204); and user terminates group list management session (step 205).

The originating switch may be a traditional circuit switch, or a soft switch, or a VoIP feature server with IMS. When the originating switch sends out its request into the network to set up the call, which may be an SS7 message or a SIP message, a field is included in the message that indicates the kinds of terminating features that should be applied to this call. The receiving switch receives that message and looks for the new field, determines what values are set, and turns on or turns off the appropriated terminating features.

The terminating switch may have a reset function to reset the terminating features to a default setting or a previous selected setting after a conference call has ended and the respective phone is disconnected. The decision to modify terminating features may occur upon each call attempt to the terminating switch.

As described above for setting up a conference call, some of these terminating features are undesirable. Therefore, it is desirable that some, if not all, of these terminating features be shut off. In other words, it is desirable to take control over the terminating features. Therefore, when calling the terminating switch, an indicator may be inserted in the signaling message or in the SIP message. This indicator may, for example, instruct the terminating switch to shut off some or all of the terminating features. Thus, for example, the phone being called may ring four times and if there is no answer, the phone is disconnected. Therefore, according to the present method and apparatus the terminating server is instructed to apply or not apply certain features.

The telephony system or terminating switch supporting each participant may take the following actions on these terminating call attempts.

(1) The telephony system provides a new Caller ID display (e.g. "Conf Call from Joe Smith") which alerts the participant that they are about to join a conference call.

(2) The telephony system overrides or modifies some of the normal terminating call features such as:

Audible Ring Tone while awaiting answer—Terminate the call after 10 seconds. This is done to prevent premise based answering systems from terminating the call.

Busy Signal—Terminate the call after 5 seconds.
Re-order Tone—Terminate the call after 5 seconds.
Can't Complete the call as dialed announcements—Terminate the call after 10 seconds.
Intercept Announcement—Terminate the call after 10 seconds.
Shared Call appearances—Disabled.
Forward on Busy no answer to another party or voice mail—Disabled.
Music on hold—Disabled As shown in FIGS. 1 and 2, an embodiment of the present method and apparatus may consist of four parts:

(1) The initiator may have the ability via a PC or mobile phone to predefine groups of friends or coworkers that are to be invited to a conference call.

(2) The initiator may have the ability to signal via their phone that they want to initiate an automatically initiated conference call to a group. This may be performed by dialing a special code (e.g. ** and the group number) or it may be accomplished on a VoIP endpoint by including the group name in a SIP invite.

(3) The originating TDM (time division multiplexing) switch or VoIP telephony feature server receives the request, invokes a conference bridge function and initiates call legs to each of the members of the group using a modified SS7 ISUP signaling or a modified SIP Invite message which indicates the call is part of an automatically initiated conference call.

Signaling System 7 (SS7) performs out-of-band signaling in support of the call-establishment, billing, routing, and information-exchange functions of the public switched telephone network (PSTN). It identifies functions to be performed by a signaling-system network and a protocol to enable their performance. The ISDN User Part or ISUP is part of the SS7 which is used to set up telephone calls in Public Switched Telephone Networks.

(4) The terminating switch or VoIP feature server receives the incoming request and may apply the terminating features as described above.

Thus, embodiments of the present method and apparatus provide a mechanism for communication from the originating switch to the terminating switch regarding the nature of the call and the kinds of terminating features that are to be applied or not applied.

Figure 3:
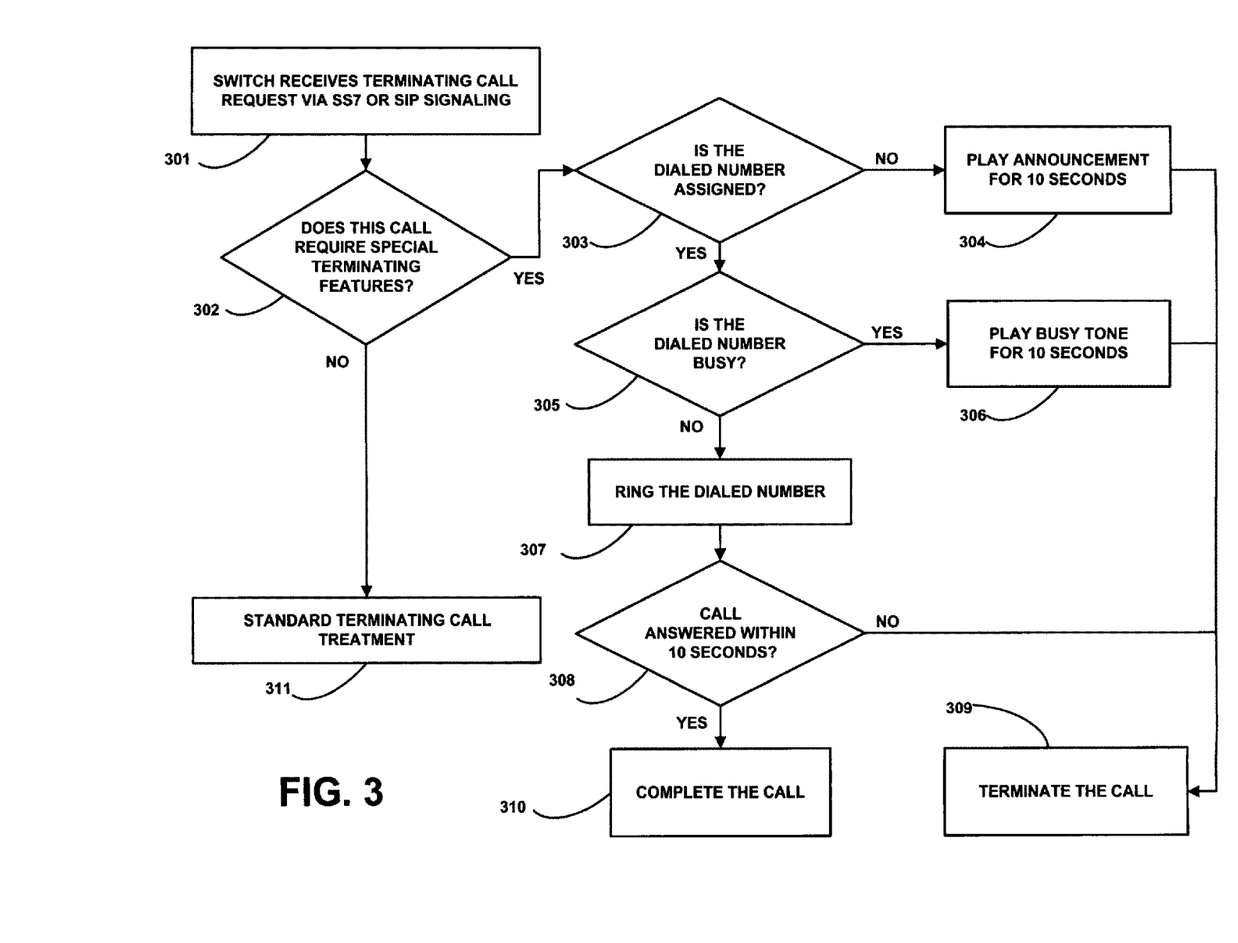
FIG. 3 is a flow diagram depicting terminating call logic for automatic initiation of group conference calls.

FIG. 3 is a flow diagram depicting terminating call logic for automatic initiation of group conference calls. This embodiment according to the present method and apparatus may have the following steps: switch receives terminating call request via SS7 or SIP signaling (step 301); does this call require special terminating features (step 302); if no, then standard terminating call treatment (step 311); if yes, then is the dialed number assigned (step 303); if no, then play announcement for 10 seconds (step 304) and terminate the call (step 309); if yes in step 303, is the dialed number busy (step 305); if yes, then play busy tone for 10 seconds (step 306) and terminate the call (step 309); if no in step 305, then ring the dialed number (step 307); call answer within 10 seconds (step 308); if no, then terminate the call (step 309); if yes, then complete call (step 310).

The following are alternative embodiments according to the present method and apparatus:

(1) The telephony switch or telephony feature server may have a table that indicates which terminating switches or telephony feature servers can support the conference call terminating signaling. If the terminating switch cannot support the new signaling, the system can block the automatic set up of that call leg and inform the user that they must manually add that party to the conference bridge.

Figure 4:
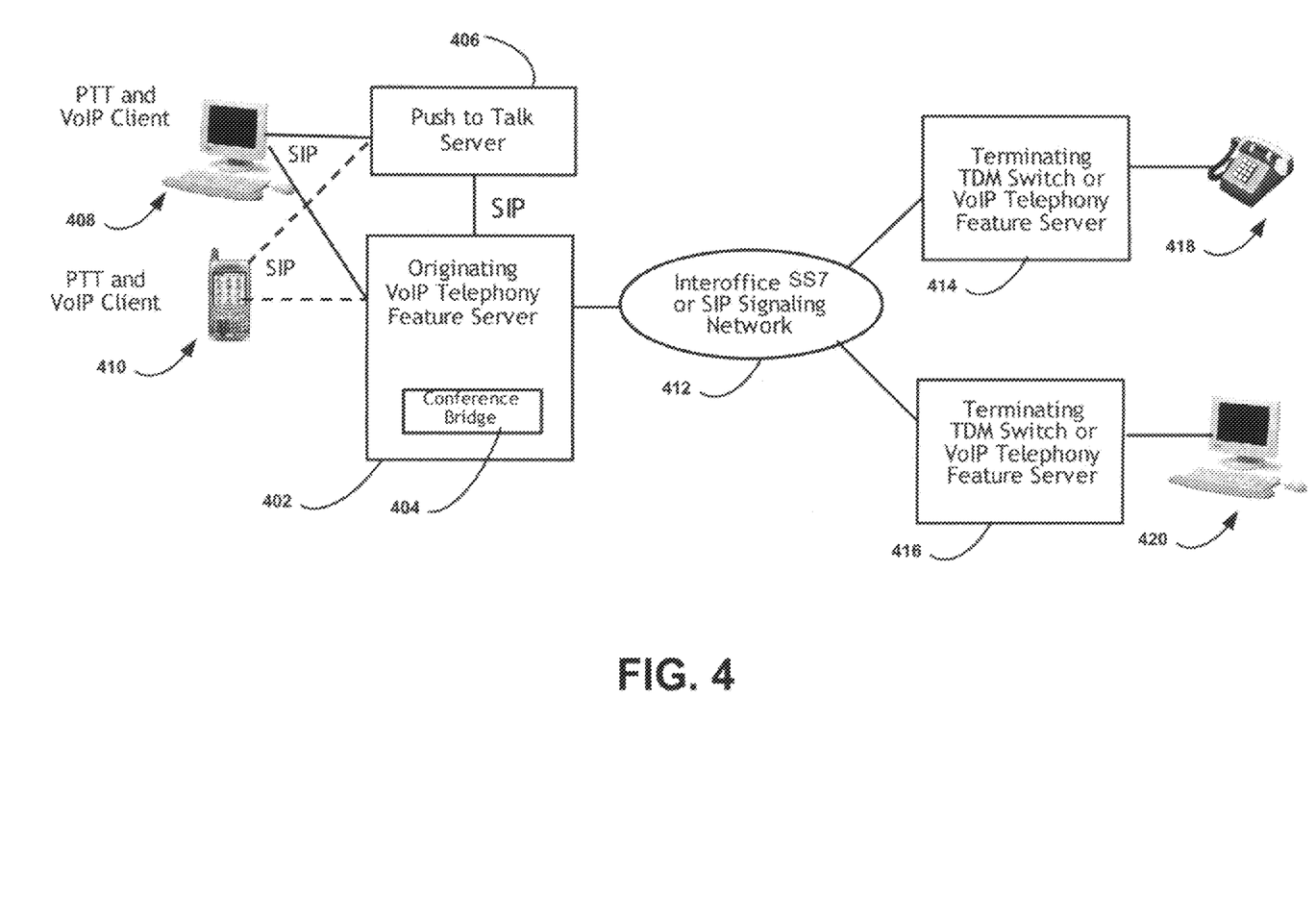
FIG. 4 depicts the automatic conference being initiated from a multiparty push-to-talk session.

(2) As depicted in FIG. 4 the automatic conference may be initiated from a multiparty push-to-talk session. In a Push-to-Talk system conversations are half duplex. Consequently multiparty discussions are difficult. Hence if the participants in a Push-to-Talk session decided they need to have an extended discussion it is advantageous to convert the multiparty Push-to-Talk sessions to full duplex conference call. The handset client or the push-to-talk server 406 can initiate the automatic conference call request and inform the originating telephony system or feature server 402 of the current participants in the push-to-talk session. If the numerous announcements and tones from calls that did go through become part of the conference call, the conference call becomes almost impossible to conduct. Therefore, it would be advantageous to be able to invoke the automatic conference call set up request with control of the terminating features when a push-to-talk session gets converted to full duplex for the conference call.

As depicted in FIG. 4 originating terminals, such as PC 408 and mobile terminal 410, are operatively coupled to a push-to-talk server 406 and an originating VoIP telephony feature server 402. The feature server 402 may have a conference bridge 404. In this embodiment, the feature server 402 communicates with the push-to-talk server 406 via SIP messages. The feature server 402 also communicates with terminating TDM switch or VoIP telephony feature servers 414, 416 via an interoffice SS7 or SIP signaling network 412. In this example, a standard telephone 418 may be operatively coupled to the feature server 414, and a PC 420 may be operatively coupled to the feature server 416.

(3) The conference bridge service may include a visual display to the originator's mobile phone or associated PC web browser, which indicates the status of each leg of the conference call. In addition this interface may be used by the initiator to add, delete or mute individual legs of the conference.

(4) The proposed implementation may be extended to support premises based PBXs and IP-PBXs.

(5) The proposed signaling mechanism can be extended to other services, which would benefit from the ability of the originating switch to signal the terminating switch as to which terminating services should be applied. For example outbound telemarketing call initiation systems would be more efficient if they could signal to the terminating switch to end the call rather than send it to voice mail if the call encounters busy or no answer.

(6) When the terminating switch ends a call because the destination phone is busy, or there is no answer, or the number is not assigned, the terminating switch may play an announcement or a tone, for example, to inform the originating switch that the call has been terminated.

Figure 5:
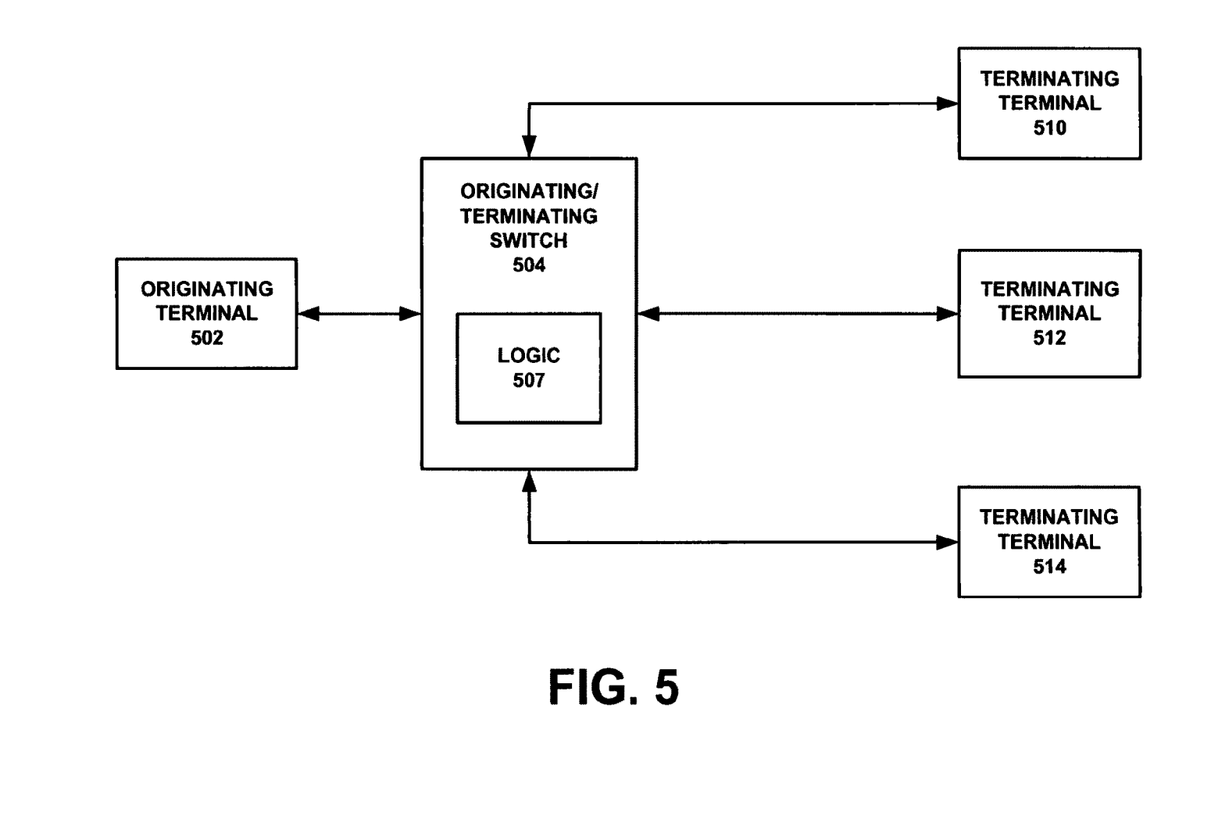
FIG. 5 depicts an alternative embodiment according to the present method and apparatus in which an originating terminal for an outgoing call may be on same switch or server 504 with terminating terminals for the incoming call.

FIG. 5 depicts an alternative embodiment according to the present method and apparatus in which an originating terminal 502 for an outgoing call may be on same switch or server 504 with terminating terminals 510, 512, 514 for the incoming call. That is, the terminal from which a call is placed and the terminal which receives the call are connected to the same switch or server. In this embodiment there is no SS7 signaling or SIP message. Therefore in this embodiment terminating call logic 507 may be provided in the switch or server 504. This logic 507 determines which terminating features are to be disabled or enabled. Thus embodiments of the present method and apparatus may apply to both intraswitch and interswitch configurations.

In such a switch there are the concepts of an originating call leg and associated software processes and a terminating call leg and associated software processes. In this case intra switch process communication mechanisms can be used from the originating process to the terminating process to indicate which terminating services should be applied to the call.

One alternative embodiment of the present method and apparatus is video conferencing. In such an embodiment an incoming video call, when unanswered, does not go to a video mailbox.

An alternative embodiment according to the present method and apparatus may be used for emergency responders. The communication system automatically calls a predetermined group of terminals for emergency responders when an emergency occurs. According to the present method and apparatus if an emergency call is not answered, then the respective server cancels the call immediately and goes on to the next call. This saves significant time in getting a message out to multiple users.

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium for the apparatus in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following.

What is claimed is:

1. An apparatus, comprising:
    a telecommunication system having an originating switch operatively coupled to at least one terminating switch;
    the terminating switch having at least one terminating call feature for a respective terminating terminal operatively coupled thereto; and
    the telecommunication system having a terminating call feature control function such that enabling and disabling of the at least one terminating call feature for the respective terminating terminal is effected by a predetermined signal message from the originating switch.

2. The apparatus according to claim 1, wherein the predetermined signal message contains a predetermined field containing information regarding the enabling and disabling of the at least one terminating call feature.

3. The apparatus according to claim 2, wherein the apparatus further comprises:
    a predetermined plurality of user terminals operatively coupled to the at least one terminating switch; and
    the telecommunication system having a conference function;
    wherein, upon activation of the conference function via the originating switch, the at least one terminating switch disabling respective terminating call features of each of the plurality of user terminals.

4. The apparatus according to claim 3, wherein an originating terminal is operatively coupled to the originating switch, and wherein the originating terminal sends a signal to the telecommunication system that a conference call to the plurality of user terminals is to be established.

5. The apparatus according to claim 4, wherein the terminating switch has a reset function to reset respective terminating features to a default setting or a previous selected setting after a conference call has ended and the respective terminating terminal is disconnected.

6. The apparatus according to claim 1, wherein the terminating switch provides a predetermined caller ID display, which indicates that the respective terminating terminal is joining a conference call.

7. The apparatus according to claim 1, wherein the terminating call features that are disabled are at least one of audible ring tone while awaiting answer, busy signal, re-order tone, busy signal, cannot complete the call as dialed announcements, intercept announcement, shared call appearances, forward on busy no answer to another party or voice mail, and music on hold.

8. The apparatus according to claim 3, wherein one of an originating TDM (time division multiplexing) switch and a VoIP telephony feature server receives a request from an originating terminal, invokes a conference bridge function, and initiates call legs to each of the predetermined plurality of user terminals using one of modified SS7 ISUP signaling or modified SIP Invite message for effecting an automatically initiated conference call.

9. The apparatus according to claim 1, wherein the originating switch has a table that indicates which terminating switches support conference call terminating signaling, and wherein, if a respective terminating switch cannot support the new signaling, the telecommunication system blocks automatic set up of that call leg and informs a user of the originating terminal that the user must manually add the respective terminating switch to a conference bridge.

10. The apparatus according to claim 1, wherein an automatic conference is initiated from a multiparty push-to-talk session.

11. The apparatus according to claim 1, wherein the apparatus further comprises a visual display to an originating terminal or associated PC web browser, which indicates a status of each leg of a conference call, and wherein the originating switch has a predetermined function that permits adding, deleting and muting of individual legs of the conference from the originating terminal.

12. The apparatus according to claim 1, wherein, when the terminating switch ends a call because a terminating terminal is busy, or there is no answer, or a number is not assigned, the terminating switch plays at least one of an announcement or a tone to inform the originating switch that the call has been terminated.

13. The apparatus according to claim 1, wherein telecommunication system includes terminating call feature control function for use in at least one of an outbound telemarketing call initiation system, video conferencing, simultaneous ring, and an emergency response call system.

14. The apparatus according to claim 1, wherein a single switch functions as both the originating switch and the terminating switch.

15. A method, comprising:
designating predetermined plurality of user terminals that are operatively coupled to at least one terminating switch;
signaling the telecommunication system to establish a conference call with the predetermined plurality of user terminals; and
the at least one terminating switch disabling respective terminating call features of each of the plurality of user terminals.

16. The method according to claim 15, wherein the terminating switch provides a predetermined caller ID display, which indicates that the respective terminating terminal is joining a conference call.

17. The apparatus according to claim 15, wherein the terminating call features that are disabled are at least one of audible ring tone while awaiting answer, busy signal, re-order tone, busy signal, cannot complete the call as dialed announcements, intercept announcement, shared call appearances, forward on busy no answer to another party or voice mail, and music on hold.

18. An apparatus, comprising:
a telecommunication system having an originating switch operatively coupled to at least one terminating switch;
a predetermined plurality of terminating terminals operatively coupled to the at least one terminating switch;
the telecommunication system having a conference function;
the terminating switch having at least one terminating call feature for a respective terminating terminal operatively coupled thereto; and
the telecommunication system having a terminating call feature control function such that enabling and disabling of the at least one terminating call feature for the respective terminating terminal is effected by a predetermined signal message from the originating switch;
wherein, upon activation of the conference function via the originating switch, the at least one terminating switch disabling respective terminating call features of each of the plurality of user terminals.

19. The apparatus according to claim 18, wherein the terminating switch provides a predetermined caller ID display, which indicates that the respective terminating terminal is joining a conference call.

20. The apparatus according to claim 18, wherein the terminating call features that are disabled are at least one of audible ring tone while awaiting answer, busy signal, re-order tone, busy signal, cannot complete the call as dialed announcements, intercept announcement, shared call appearances, forward on busy no answer to another party or voice mail, and music on hold.

* * * * *